(12) United States Patent
Kinkead et al.

(10) Patent No.: US 6,508,419 B1
(45) Date of Patent: *Jan. 21, 2003

(54) BROADCAST SPREADING TOP DRESSER

(75) Inventors: George Kinkead, Mendota Heights; Matthew A. Donner, St. Anthony, both of MN (US)

(73) Assignee: Turfco Manufacturing, Incorporated, Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/711,014

(22) Filed: Nov. 9, 2000

Related U.S. Application Data (63) Continuation of application No. 09/146,449, filed on Sep. 3, 1998, now Pat. No. 6,149,079.

(51) Int. Cl.[7] ............................................. A01C 19/00
(52) U.S. Cl. ....................... 239/668; 239/661; 239/672; 239/673; 239/676; 239/679; 239/680; 239/681; 239/682
(58) Field of Search ................................. 239/661, 668, 239/672, 673, 676, 679, 680, 681, 682

(56) References Cited

U.S. PATENT DOCUMENTS

| | | |
|---|---|---|
| 927,141 A | 7/1909 | Hackney ..................... 239/679 |
| 2,500,682 A | 3/1950 | Hoffstetter |
| 3,097,851 A | 7/1963 | Cohrs et al. ................. 239/679 |
| 3,113,784 A | 12/1963 | Swenson et al. |
| RE25,709 E | 1/1965 | Swenson et al. |
| 3,290,046 A | 12/1966 | Bell et al. ............... 239/682 X |
| 3,332,691 A | 7/1967 | Swenson et al. |
| 3,344,993 A | 10/1967 | Wilder et al. |
| 3,441,039 A | 4/1969 | Rawson |

(List continued on next page.)

FOREIGN PATENT DOCUMENTS

| | | | |
|---|---|---|---|
| EP | 0404141 | 12/1990 | ................. 239/665 |

OTHER PUBLICATIONS

Owner's Manual, TERRATOPPER T–750, TerraCare Products Co., Inc., P.O. Box 250, Pardeeville, WI (undated but prior art to application).

Photograph of T–1000, TerraCare Products Co., Inc., P.O. Box 250, Pardeeville, WI.

MULTISPREAD™, printed from www.earthandturf.com (date unknown).

Primary Examiner—Robin O. Evans
(74) Attorney, Agent, or Firm—Alan D. Kamrath; Rider, Bennett, Egan & Arundel

(57) ABSTRACT

A top dresser (10) includes a spinner assembly (40) removably connected by clips (44) to a cross beam (20) of the frame (12) mounting a hopper (30). The first and second sides (36) of the hopper (30) slope downwardly and inwardly to a conveyor (140) formed by sheeting (70) in the form of an endless belt having a relatively smooth outer surface. The valve (84) for the hydraulic motor (164) of the conveyor (140) is in series downstream of the valve (78) for the hydraulic motors (56) for the spinners (54) of the spinner assembly (40). Thus, it is not possible to mistakenly run the conveyor (140) without the spinners (54) operating. Therefore, the top dresser (10) is able to spread extremely minimal amounts of material evenly and without clumping or bunching.

27 Claims, 3 Drawing Sheets

U.S. PATENT DOCUMENTS

| | | |
|---|---|---|
| 3,550,866 A | 12/1970 | Swenson |
| 3,559,894 A | 2/1971 | Murray et al. |
| 3,679,098 A | 7/1972 | Weiss |
| 3,682,395 A | 8/1972 | van der Lely et al. |
| 3,693,890 A | 9/1972 | Torrey .................... 239/668 |
| 3,703,260 A | 11/1972 | Grabske |
| 3,790,090 A | 2/1974 | Lorenc et al. |
| 3,904,129 A | 9/1975 | Lorenc |
| 4,023,689 A | 5/1977 | Taylor et al. |
| 4,032,074 A | 6/1977 | Amerine |
| 4,098,433 A | 7/1978 | Oligschlaeger |
| 4,108,010 A | 8/1978 | Taylor et al. |
| 4,124,167 A | 11/1978 | Coleman .................. 239/673 |
| 4,212,428 A | 7/1980 | Walker |
| 4,367,848 A | 1/1983 | Ehmke et al. .......... 239/676 X |
| 4,438,873 A | 3/1984 | Kaercher, Jr. |
| 4,473,184 A | 9/1984 | Martin |
| 4,583,693 A | 4/1986 | Harder |
| 4,591,102 A | 5/1986 | Clarke .................... 239/682 X |
| 4,685,619 A | 8/1987 | Harder |
| 4,700,895 A | 10/1987 | Takata |
| 4,804,145 A | 2/1989 | Seymour et al. |
| 4,842,202 A | 6/1989 | van der Lely et al. |
| 5,046,664 A | 9/1991 | van der Lely et al. |
| 5,096,125 A | 3/1992 | Wise et al. |
| 5,170,947 A | 12/1992 | Houle et al. |
| 5,170,948 A | 12/1992 | Glick et al. |
| 5,186,396 A | 2/1993 | Wise et al. |
| 5,307,952 A | 5/1994 | Worrel et al. ........... 239/672 X |
| 5,307,965 A | 5/1994 | Worrel .................... 222/616 |
| 5,370,321 A | 12/1994 | Bianco |
| 5,478,104 A | 12/1995 | Worrel et al. ............... 280/699 |
| 5,501,403 A | 3/1996 | van Vooren |
| 5,501,405 A | 3/1996 | Doornek |
| 5,533,676 A | 7/1996 | Conley |
| 5,645,228 A | 7/1997 | Zwart |
| 5,802,994 A | 9/1998 | Kinkead et al. |
| 5,842,649 A | 12/1998 | Beck et al. |
| 5,947,391 A | 9/1999 | Beck et al. |
| 5,950,933 A * | 9/1999 | Balmer .................... 239/655 |
| 5,976,011 A | 11/1999 | Hartman |
| 5,992,134 A | 11/1999 | Blide et al. |
| 6,024,033 A | 2/2000 | Kinkead et al. |
| 6,058,860 A | 5/2000 | Kinkead et al. |
| 6,149,079 A | 11/2000 | Kinkead et al. |
| 6,202,944 B1 | 3/2001 | McCrory .................. 239/658 |
| 6,220,532 B1 | 4/2001 | Manon et al. |

* cited by examiner

BROADCAST SPREADING TOP DRESSER

CROSS REFERENCE

This application is a continuation of Application Ser. No. 09/146,449 filed Sep. 3, 1998, now U.S. Pat. No. 6,149,079.

BACKGROUND

The present invention generally relates to an apparatus for dispensing or spreading material, particularly to an apparatus for top dressing terrain, and specifically in a most preferred form to broadcast spreading top dressers.

Various apparatus exist for applying top dressing to the turf of golf courses, lawns, football, baseball and soccer fields, parks, recreational areas, and the like, for applying calcined clay on baseball diamonds, for sanding icy sidewalks and driveways, and for like applications of a ribbon of material at a preselected rate. Examples of such apparatus are shown in U.S. Pat. No. 4,438,873 which has been widely and very successfully marketed under the trademark TURFCO METE-R-MATIC and in U.S. Pat. No. 5,307,952 which has been widely and very successfully marketed under various trademarks. With the increasing awareness of the importance of top dressing in turf management, an increasing need exists for improved dispensers to allow the effective, efficient application of material with minimal damage to the turf and with increased ease of operation.

Specifically during top dressing of selected turfs especially but not limited to golf greens, it is necessary to spread the top dressing material in an equal amount and specifically without clumps or bunches where top dressing material is dispensed at a higher rate than at other locations. Top dressers of the drop type disclosed in U.S. Pat. Nos. 4,438,873 and 5,307,952 have been highly effective at applying top dressing evenly to turf. However, such drop top dressers only dispensed top dressing material across a width generally equal to the width of the top dresser itself. As top dressing often occurred during daylight, it was necessary to take the green out of play during the top dressing operation and thus the width of the dispensed top dressing material plays a major role in the number of passes required to top dress the green as well as the time required for the top dressing operation and the time that the green was out of play. Further, such drop top dressers were not very effective in spreading extremely minimal amounts of top dressing material.

Although broadcast spreaders are known for spreading seed and fertilizers, they have not penetrated the top dressing markets. In particular, prior commercially available broadcast spreaders typically utilized mesh type conveyors formed of hinged links formed of metal or similar material and forming an array of cells open at the top and bottom. Additionally, such broadcast spreaders were often driven by the power take off of the towing vehicle, with the spinners and conveyor being driven together. As a result, material was often present on the spinners at initiation of spinner rotation such that material was initially dispensed in a clump and specifically at least at a rate greater than under normal operating conditions. Thus, prior commercially available broadcast spreaders required a towing vehicle of considerable power and including a power take off, dispensed material in an amount greater than desired in a green top dressing function and unevenly at least at the start of spinner operation, and included high wear and low life conveyor components requiring frequent maintenance and repair.

Thus, a need continues to exist for the application of extremely minimal amounts of material to turf and in a manner to reduce the number of passes required to top dress a width of such turf and to reduce the amount of time needed to perform such top dressing.

SUMMARY

This need and other problems in the field of top dressing are solved, in the most preferred form, by providing a top dresser including a hydraulic system having the valve for providing hydraulic fluid flow to the conveyor drive motor being in series downstream of the valve for providing hydraulic fluid flow to the spinner motors so that it is not possible to mistakenly run the conveyor without the spinners operating and so that it is possible to clean the spinners of top dressing material before additional material is dispensed from the hopper onto the spinners.

In other preferred aspects of the present invention, the top dressing material is conveyed to rotatable spinners by sheeting in the form of an endless belt located at the bottom of the hopper and having a relatively smooth outer surface including relatively small depressions of a size generally corresponding to the particle size of the top dressing material being dispensed.

In other preferred aspects of the present invention, the spinner assembly is removably mounted to the top dresser frame by a clip including a front plate for abutting with the rear face of a frame cross beam, a top plate for abutting with the top face of the frame cross beam, and a latching plate for abutting with the front face of the frame cross beam while the cross beam and clip are secured together by a pin member so that the top dresser can become a dump cart for hauling material.

It is thus an object of the present invention to provide a novel top dresser.

It is further an object of the present invention to provide such a novel top dresser for spreading extremely minimal amounts of top dressing material.

It is further an object of the present invention to provide such a novel top dresser for spreading top dressing material evenly including at initiation of the top dressing operation.

It is further an object of the present invention to provide such a novel top dresser of the broadcast type.

It is further an object of the present invention to provide such a novel top dresser allowing the spinners to be cleaned before additional material is dispensed from the hopper onto the spinners.

It is further an object of the present invention to provide such a novel top dresser where it is not possible to mistakenly dispense material from the hopper onto the spinners while the spinners are not rotating.

It is further an object of the present invention to provide such a novel top dresser including sheeting in the form of an endless belt having a relatively smooth outer surface for dispensing material from the hopper onto spinners.

It is further an object of the present invention to provide such a novel top dresser including a removably mounted spinner assembly so that the top dresser can become a dump cart for hauling material.

Surprisingly, all of the above objectives can be satisfied in the field of material dispensing by the illustrative embodiment of a top dresser according to the preferred teachings of the present invention, detailed descriptions of which are described in connection with the drawings.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "end", "side", "above", "longitudinal", and similar terms are used herein, it should be understood that these terms have reference only to the structure shown in the drawings as it would appear to a person viewing the drawings and are utilized only to facilitate describing the invention.

DESCRIPTION

Figure 1:
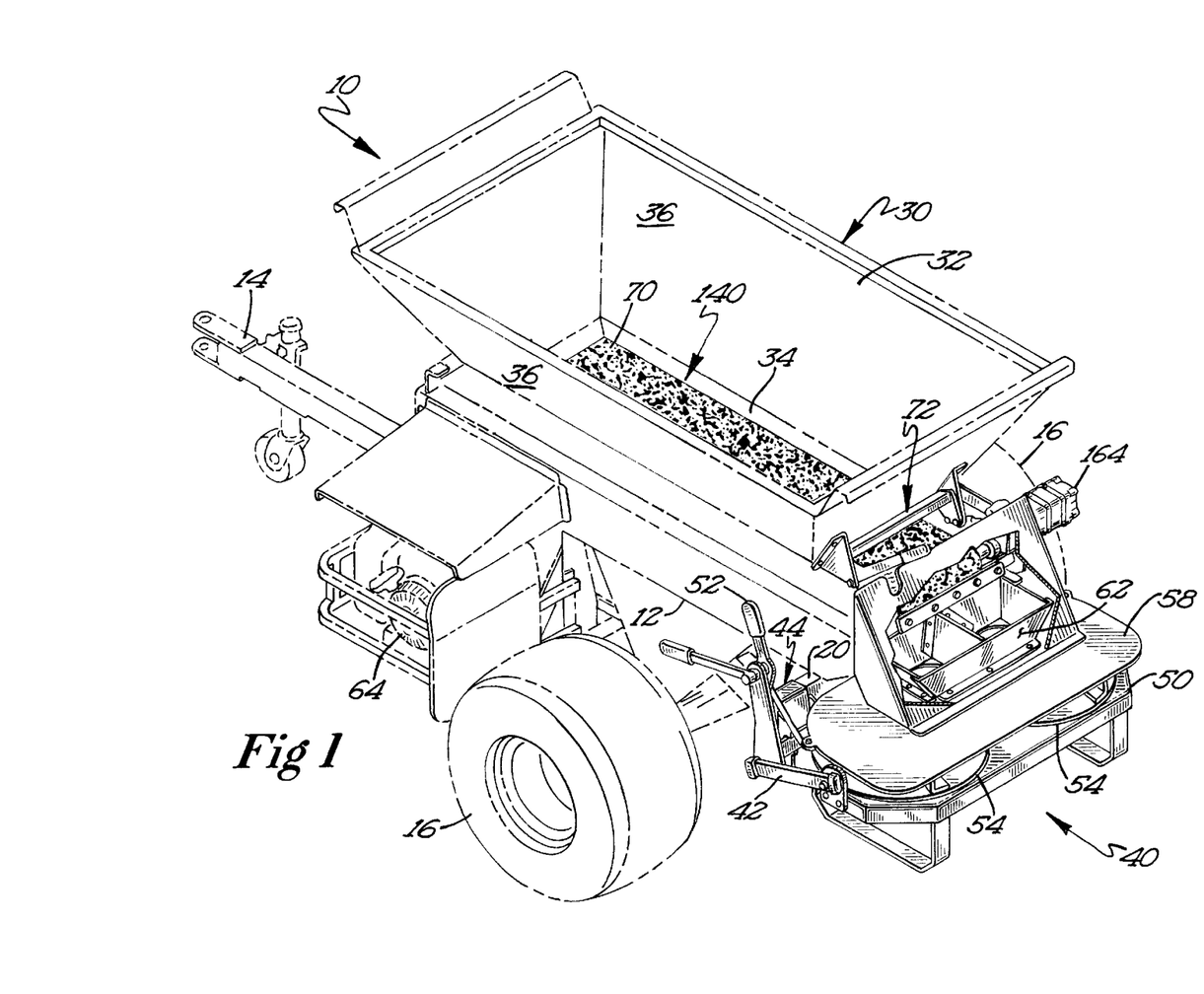
FIG. 1 shows a perspective view of a top dresser according to the preferred teachings of the present invention, with portions being broken away to expose constructional details.
Figure 2:
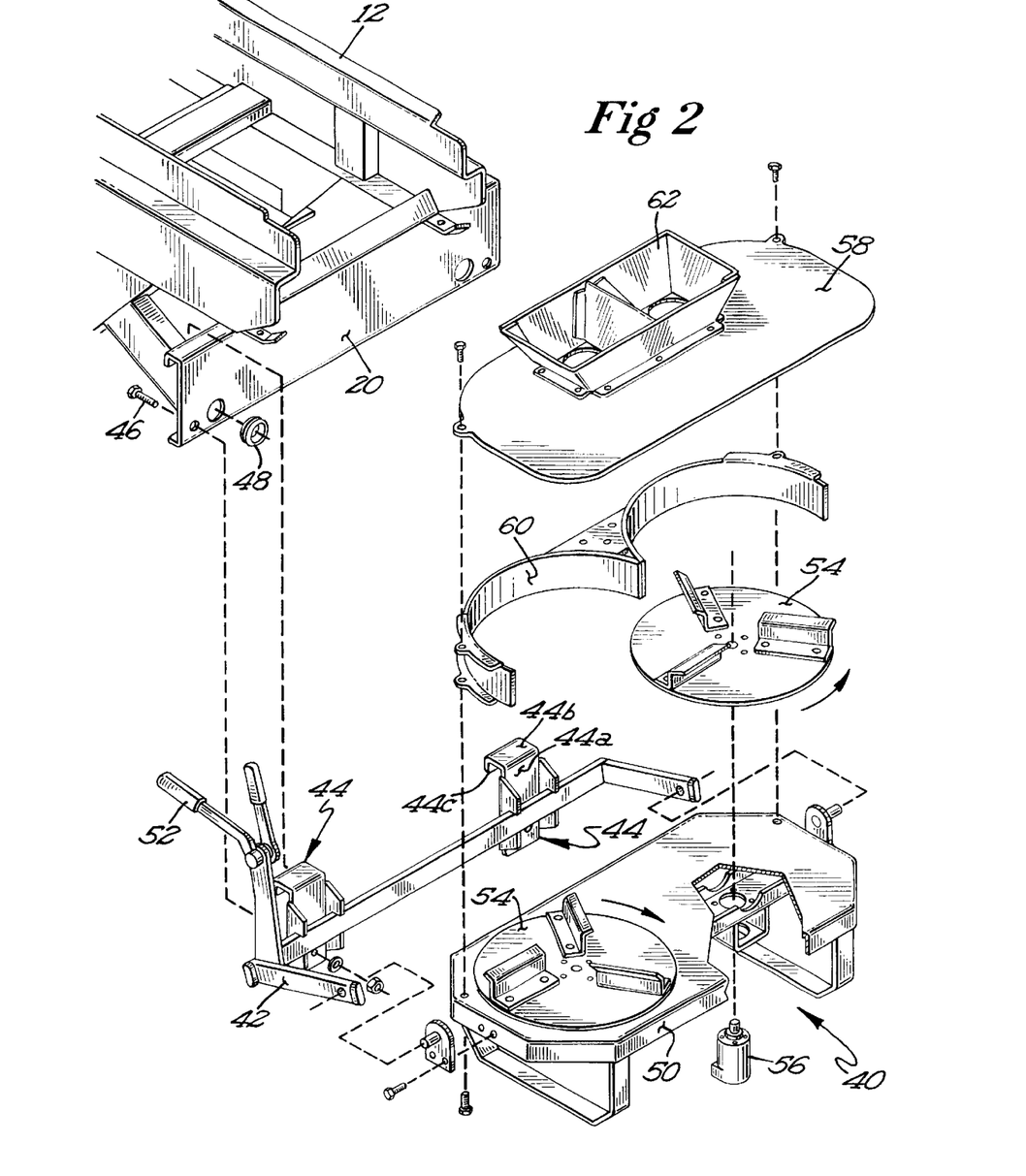
FIG. 2 shows a partial, exploded, perspective view of the top dresser of FIG. 1, with portions being broken away to expose constructional details.

A top dresser according to the preferred teachings of the present invention is shown in the drawings and generally designated 10. In the preferred form, top dresser 10 includes a frame 12 having a drawbar 14 by which top dresser 10 can be coupled to a towing tractor or utility vehicle for pulling thereby in a direction. In the preferred form, frame 12 is movably supported upon the ground by a pair of high floatation wheels 16. In the most preferred form, frame 12 includes a cross beam 20 extending transversely generally perpendicular to the pulling direction of top dresser 10 and located at the back of frame 12 behind wheels 16. Cross beam 20 has a rear face, a top face, and a front face.

A hopper 30 for containing top dressing material is mounted on frame 12. Hopper 30 generally includes an open top 32, a closed floor or bottom 34, first and second, sloping, closed sides 36, a back and a front. In the most preferred form, sides 36 extend at an obtuse angle outwardly relative to bottom 34.

In the most preferred form to advance material contained in hopper 30, sheeting 70 is utilized in a horizontally extending, endless belt conveyor 140 located at the bottom of hopper 30 such as generally of the type shown in U.S. Pat. No. 4,438,873, which is hereby incorporated herein by reference. Specifically, conveyor 140 is disposed so that sheeting 70 in the form of an endless belt passes beneath hopper 30, so as to have gravitationally discharged thereon whatever material is contained in hopper 30 that is to be used in dressing the turf. Sheeting 70 in the form of an endless belt passes over a first, generally cylindrical roller rotatably mounted on a transverse, horizontal shaft which may be adjustable in a fore and aft direction. Conveyor 140 further includes a second, generally cylindrical roller mounted for rotation on a transverse, horizontal shaft, with the second roller being parallel to and horizontally spaced from the first roller. The second roller is rotated by a hydraulic motor 164. Sheeting 70 passes over a platen or bed plate that is fixedly supported by bottom 34 of hopper 30 of top dresser 10, with the bed plate optionally including a coating or the like to reduce friction between the bed plate and sheeting 70.

Conveyor 140 dispenses material from hopper 30 through the back of hopper 30. Top dresser 10 further includes metering gate 72 movably mounted at the back of hopper 30 and movable relative to conveyor 140 to meter the amount of material being dispensed by sheeting 70. Specifically, gate 72 is movable away from conveyor 140 by any suitable means to create a larger gap for material to pass therethrough such as by pivotally moving gate 72 manually or by hydraulic actuators.

In the preferred form, sheeting 70 is formed from an endless belt having an outer surface which is relatively smooth between sides 36 of hopper 30 and in the most preferred form with the outer surface including a shallow pattern. Particularly, sheeting 70 includes relatively small depressions of a size generally corresponding to the particle size of the top dressing material which is typically dispensed by top dresser 10. Specifically, in the preferred form, the depressions are of a size no longer than 0.20 inch (0.5 cm) in any direction and in the most preferred form are generally rectangular shaped of a length of 0.20 inch (0.5 cm) and a width of 0.15 inch (0.38 cm) and a depth of 0.05 inch (0.13 cm). Sheeting 70 in the preferred form is formed of rubber but can be formed of other materials which are not subject to corrosion or other degradation by exposure to top dressing material such as plastic as long as the functional requirements for conveyor 140 are met.

Top dresser 10 according to the preferred teachings of the present invention includes a spinner assembly 40 for dispensing the material contained in hopper 30 to a width generally greater than the width of hopper 30 and top dresser 10. According to the preferred teachings of the present invention includes generally a U-shaped support 42 removably secured to frame 12. Particularly, in the most preferred form, first and second clips 44 are secured to the central portion of support 42 in a spaced relation such as by welding. Clips 44 each generally include a front plate 44a for abutting with the rear face of cross beam 20, a top plate 44b extending generally perpendicularly from front plate 44a for a distance generally equal to the thickness of cross beam 20, and a latching plate 44c extending generally perpendicularly downward from top plate 44b and parallel to front plate 44a. In the most preferred form, clips 44 are positioned with top plate 44b extending over the horizontal top face of cross beam 20 and with latching plate 44c and front plate 44a extending over the vertical front and back faces of cross beam 20, respectively. Clips 44 can be secured in position such as by bolts or similar pins 46 removably extending through cross beam 20 and clips 44. Rubber grommets 48 can be mounted in cross beam 20 for abutting with support 42 when secured to cross beam 20 by clips 44.

Assembly 40 further includes a carrier 50 pivotally mounted to support 42 about a transversely extending carrier axis, such as between the free ends of the legs of support 42. Suitable provisions such as a lockable lever 52 pivotally mounted to support 42 and connected by suitable linkage to carrier 50 can be provided to selectively position carrier 50 at a desired pivotal angle relative to support 42.

Assembly 40 further includes a pair of spinners 54 rotatably mounted to carrier 50 about spaced, parallel axes extending generally perpendicular to the carrier axis. Each spinner 54 has associated therewith a hydraulic motor 56 for rotating spinner 54 relative to carrier 50. Spinners 54 are located between carrier 50 and an upper sheet 58 held in a spaced, parallel relation to carrier 50 by a spinner guide 60. In the most preferred form, guide 60 is in the form of interconnected semicylindrical portions extending around the front and sides of spinners 54. A dividing chute 62 is positioned on upper sheet 58 for receiving material from conveyor 140 and generally directing the material dispensed from the transverse half of sheet 70 upon the respective spinner 54.

Figure 3:
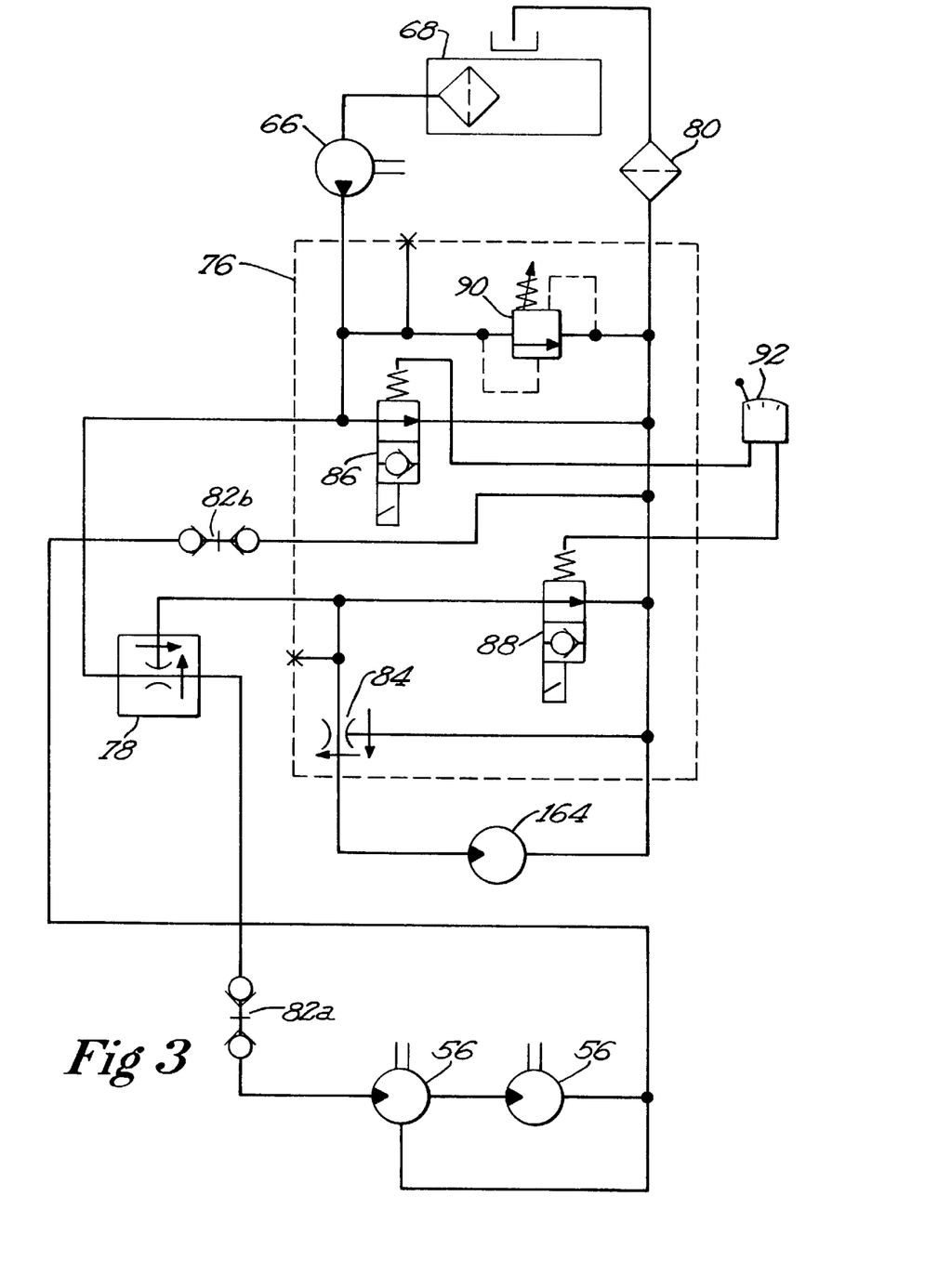
FIG. 3 shows a diagrammatic view of the hydraulic system for the top dresser of FIG. 1.

The machine functions including movement of sheeting 70 and rotation of spinners 54 in top dresser 10 according to the teachings of the present invention are powered by a self-contained, nine horsepower, overhead valve, internal combustion gas engine 64 suitably mounted to frame 12. Engine 64 drives a hydraulic pump 66 for drawing hydraulic fluid from a storage tank 68 and supplying it under pressure to a manifold block 76 which directs hydraulic fluid to a first control valve 78. Valve 78 splits the total flow in the preferred form of 6 gallons per minute into two paths ie a first path for hydraulic motors 56 of spinners 54 and bypassing motor 164 of conveyor 140 and a second path for hydraulic motor 164 of conveyor 140 and bypassing hydraulic motors 56 of spinners 54. Valve 78 has a mechanical stop to limit the flow to hydraulic motors 56 to be less than the total flow of pump 66, and specifically about two thirds of the total flow and particularly in the preferred form at 4 gallons per minute. The amount of the total flow passing to the first path controls the rotational speed of hydraulic motors 56. After passing through motors 56, the hydraulic fluid flow in the first path returns to tank 68 via manifold block 76 and a filter 80 positioned intermediate tank 68 and manifold block 76. In the most preferred form, first and second pairs of quick disconnect hydraulic fittings 82a and 82b are provided in the first flow path before and after hydraulic motors 56. One of the first pair of fittings 82a (such as the male fitting) is carried by frame 12 while the other of the first pair of fittings 82a (such as the female fitting) is carried by spinner assembly 40. One of the second pair of fittings 82b (such as the male fitting) is carried by spinner assembly 40 and for receipt in the other of the first pair of fittings 82a while the other of the second pair of fittings 82b (such as the female fitting) is carried by frame 12 and for receipt in the one of the first pair of fittings 82a. Thus, spinner assembly 40 can be removed from top dresser 10 and allowing the first hydraulic flow path to go from valve 78 directly to tank 68 via manifold block 76.

A second control valve 84 is in the second path of valve 78 and thus is in series downstream of valve 78. In the most preferred form, valve 84 is housed in manifold block 76. Valve 84 splits the hydraulic fluid from the second path between one or both of two flow subpaths. The first subpath is for hydraulic motor 164 of conveyor 140 and the second subpath is directly to tank 68 via filter 80 and bypassing motor 164 of conveyor 140. As valve 84 is in series downstream from valve 78, hydraulic fluid flow is available to motors 56 of spinners 54 for rotating spinners 54 whenever hydraulic fluid flow is available to motor 164 for advancing sheeting 70 and dispensing material from hopper 30. Valve 84 limits the flow to hydraulic motor 164 to be less than the total flow of pump 66, and specifically about one half of the total flow of pump 66, and particularly in the preferred form at 3 gallons per minute. The amount of the total flow passing to the first subpath controls the rotational speed of hydraulic motor 164. After passing through motor 164, the hydraulic fluid flow in the first subpath returns to tank 68 via manifold block 76 and filter 80.

In the preferred form, normally open, electrically actuated solenoid valves 86 and 88 are provided in manifold block 76 parallel to and allowing bypassing of valves 78 and 84, respectively, when in an open condition. In the event of an electrical failure, valves 86 and 88 prevent operation of all hydraulic functions. An adjustable pressure relief valve 90 is further provided in manifold block 76 to reduce hydraulic flow to valve 86 under higher than desired hydraulic pressure.

According to the preferred teachings of the present invention, valves 84, 86, 88, and 90 are housed in manifold block 76. The use of a single manifold block 76 is highly beneficial in that it limits the number of adapters and hydraulic hose lines. This minimizes leakage points and the chance of leakage which is especially important in turf management, and this increases the efficiency of the hydraulic system.

Now that the basic construction of top dresser 10 according to the preferred teachings of the present invention has been explained, preferred modes of operation of top dresser 10 can be set forth and some of the advantages obtained thereby can be highlighted. For purposes of explanation, it will be assumed that hopper 30 contains material to be dispensed, that top dresser 10 has been pulled to a location where the material is desired to be dispensed, and engine 64 is running and driving pump 66. Assuming that the hydraulic fluid is within desired pressure limits, initially all fluid flow will simply pass through valve 86 to tank 68.

When it is desired to start to dispense material, an electric hand held switch 92 is moved from an off position to a first actuation position to move valve 86 to a closed position such that hydraulic fluid is supplied under pressure to valve 78. From valve 78, hydraulic fluid is simultaneously supplied to the two paths namely to hydraulic motors 56 and to valves 84 and 88. When hydraulic fluid is supplied to hydraulic motors 56, spinners 54 are rotated by hydraulic motors 56 at a speed corresponding to the setting of valve 78. In the first position of switch 92, valve 88 remains in its normally open position such that hydraulic flow bypasses valve 84 and hydraulic motor 164.

It can then be appreciated that in the preferred form, spinners 54 are rotated before conveyor 140 is actuated. Any material located on spinners 54 will be thrown therefrom by centrifugal forces as the result of rotation of spinners 54. Thus, spinners 54 will spin off any material located thereon before any material is conveyed thereon by conveyor 140. Thus, clumping of the dispensed material at start up is avoided according to the teachings of the present invention. The speed at which spinners 54 rotate can be manually adjusted by adjustment of valve 78 according to the preferred teachings of the present invention.

After spinners 54 have had a chance to spin off any residual material, switch 92 is moved from its first actuation position to its second actuation position. In the second position of switch 92, valve 86 remains in its closed position and valve 88 is also moved to its closed position such that hydraulic fluid is supplied under pressure to valve 84. From valve 84, hydraulic fluid is simultaneously supplied to the two subpaths namely to hydraulic motor 164 and to tank 68. When fluid is supplied to hydraulic motor 164, the shaft of the second roller is rotated to advance sheeting 70 of conveyor 140 at a speed corresponding to the setting of valve 84. With advancement of sheeting 70, material is carried by sheeting 70 beneath metering gate 72 and conveyed into dividing chute 62 and onto spinners 54, with the material being thrown by centrifugal forces from spinners 54 and thereby dispensed onto the turf by top dresser 10 as top dresser 10 is being pulled. The amount of material which is dispensed by top dresser 10 being dependent upon the vertical spacing of metering gate 72 from sheeting 70 and by the speed of sheeting 70, both of which are independently adjustable and upon the ground speed of top dresser 10.

When it is desired to stop dispensing material, switch 92 is moved from the second position to the first position. When switch 92 is moved from the second position, valve 88 is allowed to return to its normally open position so that hydraulic fluid flow bypasses valve 84 and hydraulic motor 164. Thus, movement of sheeting 70 relative to hopper 30 is discontinued so that no further material is delivered by conveyor 140 to spinner assembly 40. It is advantageous to delay moving switch 92 from the first position to the off position so that spinners 54 continue to rotate for a time after conveyor 140 is deactivated so that any material is dispensed from spinners 54 before rotation of spinners 54 is stopped to eliminate or reduce any residual material remaining on spinners 54 at the start of the next operation. After the desired delay, switch 92 can be moved from the first position to the off position whereby valve 86 is allowed to move to its open position so that hydraulic fluid flow bypasses valve 78 and hydraulic motors 56. Thus, rotation of spinners 54 in assembly 40 is also discontinued.

It can be appreciated that top dresser 10 according to the preferred teachings of the present invention is advantageous for several reasons. First, conveyor 140 in the form of sheeting 70 of a width which is less than the width of hopper 30 is advantageous as generally not being subject to corrosion or other degradation as the result of exposure to top dressing material. Additionally, sheeting 70 is less prone to wear, requires less maintenance and repair, and has reduced sliding friction and thus requires less drive energy input than prior mesh type conveyors utilized in broadcast spreaders. Additionally, the relatively smooth outer surface including relatively small depressions of sheeting 70 according to the teachings of the present invention allows an extremely minimal amount of top dressing material to be dispensed to spinners 54 in comparison to the minimum amount carried by the array of open cells in mesh type conveyors utilized in prior broadcast spreaders. Although prior drop top dressers of the type shown in U.S. Pat. No. 4,438,873 initially included conveyors having nonpatterned sheeting (which were replaced with sheeting including ribs and channels as taught by U.S. Pat. No. 5,307,952 due to its material gripping characteristics), it is believed that the field had not previously recognized the advantages of utilizing sheeting having a shallow patterned outer surface in broadcast spreaders and especially to allow broadcast spreaders to be utilized to top dress extremely minimal amounts of material in a top dressing function. Furthermore, according to the teachings of the present invention, top dresser 10 has a relatively long length between the front and back of hopper 30 and specifically of a length to allow loading of hopper 30 directly from a normal width bucket of a loader.

The hydraulic system according to the teachings of the present invention is especially advantageous in that it is not possible to mistakenly run conveyor 140 without spinners 54 operating and so that it is possible to clean spinners 54 of top dressing material after material is no longer being dispensed by conveyor 140 and/or before additional material is dispensed by conveyor 140 from hopper 30 onto spinners 54. This ability is especially important in the ability of top dresser 10 according to the teachings of the present invention in top dressing the material in an equal amount and specifically without clumps or bunches where top dressing material is dispensed at a higher rate than at other locations. In particular, as spinners 54 can be rotated after advancement of conveyor 140 has been stopped, spinners 54 can broadcast all of the material therefrom so that residual material on spinners 54 can be eliminated or at least greatly minimized. Additionally, even if material should be located on spinners 54 prior to initial operation, spinners 54 can be rotated before advancement of conveyor 140 and thereby broadcasting all of the material therefrom to thereby clean themselves before the dispensing of additional material thereon by conveyor 140. Thus, top dresser 10 according to the teachings of the present invention can dispense top dressing material evenly without clumps or bunches.

It should be appreciated that the use of a single switch 92 to control valves 86 and 88 according to the preferred teachings of the present invention is advantageous. Specifically, before valve 88 can be closed to provide hydraulic flow to hydraulic motor 164 of conveyor 140, switch 92 must be moved through the first position to provide hydraulic flow to hydraulic motors 56 of spinners 54 before hydraulic fluid can be provided to hydraulic motor 164. Similarly, it is not possible to stop hydraulic flow to valve 78 without first stopping hydraulic fluid flow to hydraulic motor 164. Thus, it is not possible for the operator to accidentally operate conveyor 140 without spinners 54 operating which could result in clumping or bunching. Therefore, control of the hydraulic system by use of a single switch 92 is simplified in addition to minimizing the number of components which must be inventoried and assembled.

In addition, since valve 84 is in series downstream of valve 78, priority of hydraulic fluid flow is given to hydraulic motors 56 of spinners 54 to insure that spinners 54 are rotated and rotate at the desired speed under all conditions. Specifically, in the event that the sum of the hydraulic flow desired to hydraulic motors 56 and 164 exceed the potential total of the hydraulic flow through pump 66, the hydraulic fluid flow is always assured to spinners 54 so that it is less likely that the rotation is slowed and/or is not steady, in either case resulting in the top dressing material being applied unevenly to the turf. Additionally, this is advantageous in allowing the size of pump 66 and more importantly of engine 64 to be minimized. In particular, although the sum of the hydraulic flow desired to hydraulic motors 56 and 164 in the preferred form could be up to 7 gallons per minute, pump 66 is able to pump 6 gallons per minute. If pump 66 were of a size to pump 7 gallons per minute, the size of engine 64 may have to be increased above nine horsepower as provided in the preferred form and adding a significant cost increase in components. Likewise, the total hydraulic flow to motors 56 and 164 will normally decrease over time due to wear of engine 64, pump 66, and valves 78, 84, 86, 88, and 90. According to the preferred teachings of the present invention, motors 56 always have priority and are rotated at the desired rotational speed under all conditions.

Furthermore, the use of the first and second pairs of quick disconnect hydraulic fittings 82*a* and 82*b* in the first path of valve 78 and the removable securement of spinner assembly 40 by clips 44 and bolts 46 according to the preferred teachings of the present invention is advantageous in allowing removal of spinner assembly 40 from top dresser 10. Thus, top dresser 10 can be utilized as a dump cart for hauling material even though valve 84 and hydraulic motor 164 are in series downstream of valve 78 providing hydraulic flow to hydraulic motors 56. In the most preferred form, deflector assemblies, not shown, can be removably secured by clips 44 to cross beam 20 of frame 12, if desired, to direct the material from conveyor 140 into a smaller area when top dresser 10 is utilized as a dump cart. It can also be appreciated that other attachments including clips 44 to allow removable securement to frame 12 can be provided to allow top dresser 10 to be utilized in other functions as desired, and such attachments may include hydraulically driven components.

It can then be appreciated that as the top dressing material is broadcast by top dresser 10 as the result of being thrown by centrifugal forces when dispensed upon rotating spinners 54 according to the teachings of the present invention, top dresser 10 is able to top dress an area of a width up to 20 times the width of conveyor 140, 10 times the maximum width of hopper 30 and up to 5 times the width of top dresser 10, with the width being variable in the most preferred form by adjusting the rotational speed of spinners 54 by adjusting the hydraulic fluid flow to the first path by adjustment by valve 78 and by adjusting the angle of carrier 50. Thus, top dresser 10 according to the teachings of the present invention can decrease the amount of time needed to top dress a golf course close to 75 percent compared to a conventional drop top dresser. Additionally, the top dressing material dispensed can be minimized by maximizing the rotational speed of spinners 54 and thus maximizing the width of the area being top dressed, by minimizing the rotational speed of motor 164 and thus the speed of sheeting 70 and conveyor 140, and by minimizing the gap between gate 72 and conveyor 140.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Top dresser comprising, in combination: a hopper for containing top dressing material; a spinner assembly including at least one rotatable spinner rotatable by a hydraulic motor; a dispensing conveyor advancing top dressing material in the hopper onto the rotatable spinner, with the dispensing conveyor being driven by a hydraulic motor; a first control valve dividing hydraulic fluid flow between a first path and a second path, with the first path including the hydraulic motor of the spinner, with the second path bypassing the hydraulic motor of the spinner; a second control valve, with the second path including the second valve, with the second valve dividing hydraulic fluid flow of the second path between a first subpath and a second subpath, with the first subpath including the hydraulic motor for driving the dispensing conveyor and with the second subpath bypassing the hydraulic motor for driving the dispensing conveyor, with the second control valve being in series downstream of the first control valve to insure that hydraulic fluid flow is available to the hydraulic motor of the spinner for rotating the spinner whenever hydraulic fluid flow is available to the hydraulic motor for driving the dispensing conveyor for dispensing top dressing material onto the rotating spinner for being broadcast by the rotating spinner; a third valve providing a bypass path of the hydraulic fluid flow around the second valve requiring that the third valve be closed prior to hydraulic fluid flow being available from the first valve to the second valve and the hydraulic motor for driving the dispensing conveyor; a fourth valve providing a bypass path of hydraulic fluid flow around the first valve requiring that the fourth valve be closed prior to hydraulic fluid flow being available to the first valve and the hydraulic motor of the spinner; and an electrical switch movable between an off position and a first actuation position and movable between the first actuation position and a second actuation position, with the third and fourth valves being electrically actuated valves, with the fourth valve being electrically actuated in both the first and second actuating positions, with the third valve being electrically actuated only in the second actuating position.

2. The top dresser of claim 1 with the third valve being in parallel with the second control valve and the fourth valve being in parallel with the first control valve.

3. The top dresser of claim 1 wherein the hopper includes first and second, sloping closed sides, a bottom and a back, with the first and second closed sides extending outwardly at an obtuse angle outwardly relative to the bottom; and wherein the dispensing conveyor comprises sheeting in the form of an endless belt located at the bottom of the hopper so as to have top dressing material contained in the hopper gravitationally discharged on the sheeting, with the back of the hopper including means for metering the amount of material being dispensed from the hopper by the sheeting, with the hydraulic motor for driving the dispensing conveyor comprising a hydraulic motor for advancing the sheeting relative to the hopper.

4. The top dresser of claim 1 wherein the fluid flow to the first path is less than the total hydraulic fluid flow to the first valve.

5. The top dresser of claim 2 further comprising, in combination: a pressure relief valve for reducing hydraulic fluid flow to the first control valve under higher than desired hydraulic pressure; and a manifold block including the pressure relief valve and the second, third, and fourth valves to minimize leakage points.

6. The top dresser of claim 1 wherein the first valve adjustably varies hydraulic fluid flow between the first and second paths; and wherein the second valve adjustably varies hydraulic fluid flow between the first and second subpaths.

7. The top dresser of claim 1 wherein the first path includes first and second pairs of quick disconnect hydraulic fittings to allow removal of the hydraulic rotor of the spinner and to allow hydraulic fluid flow to the second valve and to the hydraulic motor for driving the dispensing conveyor.

8. The top dresser of claim 7 further comprising, in combination: a frame including a cross beam having a rear face, a top face and a front face, with the hopper being mounted to the frame; and means for removably mounting the spinner assembly to the frame comprising, in combination: at least one clip secured to the spinner assembly including a front plate for abutting with the rear face of the cross beam, a top plate extending from the front plate for abutting with the top face of the cross beam, and a latching plate extending from the top plate for abutting with the front face of the cross beam, and means extending through the cross beam and the front plate for securing the clip to the cross beam.

9. Top dresser comprising, in combination: a hopper for containing top dressing material; a spinner assembly including at least one rotatable spinner rotatable by a hydraulic motor; a dispensing conveyor advancing top dressing material in the hopper onto the rotatable spinner, with the dispensing conveyor being driven by a hydraulic motor; a first path including the hydraulic motor of the spinner; a second path; a first control valve dividing hydraulic fluid flow between the first path and the second path; a second control valve, with the second path including the second valve, with the second valve dividing the hydraulic fluid flow of the second path between a first subpath and a second subpath, with the first subpath including the hydraulic motor for driving the dispensing conveyor and with the second subpath bypassing the hydraulic motor for driving the dispensing conveyor, with the second control valve being in series downstream of the first control valve to insure that hydraulic fluid flow is available to the hydraulic motor of the spinner for rotating the spinner whenever hydraulic fluid flow is available to the hydraulic motor for driving the dispensing conveyor for dispensing top dressing material onto the rotating spinner for being broadcast by the rotating spinner; a third valve providing a bypass path of the hydraulic fluid flow around the second valve requiring that the third valve be closed prior to hydraulic fluid flow being available from the first valve to the second valve and the hydraulic motor for driving the dispensing conveyor; a fourth valve providing a bypass path of hydraulic fluid flow around the first valve requiring that the fourth valve be closed prior to hydraulic fluid flow being available to the first valve and the hydraulic motor of the spinner; and a switch movable between an off position and a first actuation position and movable between the first actuation position and a second actuation position, with the fourth valve being actuated in both the first and second actuating positions, with the third valve being actuated only in the second actuating position.

10. The top dresser of claim 9 wherein the fluid flow in the first path bypasses the hydraulic motor for driving the dispensing conveyor.

11. The top dresser of claim 10 wherein the fluid flow to the first path is less than the total hydraulic fluid flow to the first valve.

12. The top dresser of claim 9 with the third valve being in parallel with the second control valve and the fourth valve being in parallel with the first control valve.

13. The top dresser of claim 12 further comprising, in combination:
a pressure relief valve for reducing hydraulic fluid flow to the first control valve under higher than desired hydraulic pressure; and a manifold block including the pressure relief valve and the second, third, and fourth valves to minimize leakage points.

14. The top dresser of claim 9 wherein the first valve adjustably varies hydraulic fluid flow between the first and second paths; and wherein the second valve adjustably varies hydraulic fluid flow between the first and second subpaths.

15. Top dresser comprising, in combination: a hopper for containing top dressing material; a spinner assembly including at least one rotatable spinner rotated by a hydraulic motor; a dispensing conveyor advancing top dressing material from the hopper onto the rotatable spinner, with the dispensing conveyor being driven by a hydraulic motor; and a switch movable between an off position and a first actuation position and movable between the first position and a second actuation position, with the first actuation position supplying hydraulic fluid flow to the hydraulic motor of the spinner and bypassing hydraulic fluid flow to the hydraulic motor of the dispensing conveyor, with the second actuation position supplying hydraulic fluid flow to the hydraulic motors of both the spinner and the dispensing conveyor, with the switch insuring that hydraulic fluid flow is available to the hydraulic motor of the spinner for rotating the spinner whenever hydraulic fluid flow is available to the hydraulic motor for driving the dispensing conveyor for dispensing top dressing material onto the rotating spinner for being broadcast by the rotating spinner.

16. The top dresser of claim 15 further comprising, in combination: a first control valve dividing hydraulic fluid flow between a first path and a second path, with the first path including the hydraulic motor of the spinner, with the second path bypassing the hydraulic motor of the spinner; and a second control valve dividing hydraulic fluid flow between a third path and a fourth path, with the third path including the hydraulic motor of the dispensing conveyor, with the fourth path bypassing the hydraulic motor of the dispensing conveyor, with the first control valve being actuated in the first and second actuation positions and the second control valve being actuated only in the second actuation position.

17. The top dresser of claim 16 wherein the first path includes first and second pairs of quick disconnect hydraulic fittings to allow removal of the hydraulic motor of the spinner and to allow hydraulic fluid flow to the second control valve and to the hydraulic motor for driving the dispersing conveyor.

18. The top dresser of claim 17 with hydraulic fluid flow through the first path bypassing the second control valve and the hydraulic motor for driving the dispensing conveyor.

19. The top dresser of claim 16 further comprising, in combination: a dispense control valve dividing hydraulic fluid flow of the third path between a first subpath and a second subpath, with the first subpath including the hydraulic motor for driving the dispensing conveyor and with the second subpath bypassing the hydraulic motor for driving the dispensing conveyor.

20. The top dresser of claim 16 further comprising, in combination: a pressure relief valve in parallel with the first and second valves for reducing hydraulic fluid flow under higher than desired hydraulic pressure; and a manifold block including the pressure relief valve and the first and second control valves to minimize leakage points.

21. The top dresser of claim 16 further comprising, in combination: a third control valve for dividing hydraulic fluid flow of the first path between a spinner path and a dispenser path, with the dispenser path including the third path, with the spinner path including the hydraulic motor of the spinner.

22. The top dresser of claim 21 with the spinner path bypassing the hydraulic motor of the dispensing conveyor independent of the second control valve.

23. The top dresser of claim 21 further comprising, in combination: a dispenser control valve dividing hydraulic fluid flow of the dispenser path between a first subpath and a second subpath, with the first subpath including the hydraulic motor for driving the dispensing conveyor and with the second subpath bypassing the hydraulic motor for driving the dispensing conveyor.

24. The top dresser of claim 23 with the third control valve adjustably varying hydraulic fluid flow between the spinner path and the dispenser path, with the dispensing control valve adjustably varying hydraulic fluid flow between the first and second subpaths.

25. Top dresser comprising, in combination: a hopper for containing top dressing material; a spinner assembly including at least one rotatable spinner rotatable by a hydraulic motor; a dispensing conveyor advancing top dressing material in the hopper onto the rotatable spinner, with the dispensing conveyor being driving by a hydraulic motor; a first control valve dividing hydraulic fluid flow between a first path and a second path, with the first path including the hydraulic motor of the spinner, with the second path bypassing the hydraulic motor of the spinner; a second control valve, with the second control valve dividing hydraulic fluid flow between a third path and a fourth path, with the third path including the hydraulic motor for driving the dispensing conveyor and with the fourth path bypassing the hydraulic motor for driving the dispensing conveyor, with the second control valve receiving hydraulic flow of the second path of the first control valve; a third valve providing a bypass path of the hydraulic fluid flow around the second valve requiring that the third valve be closed prior to hydraulic fluid flow being available from the first valve to the second valve and the hydraulic motor for driving the dispensing conveyor; a fourth valve providing a bypass path of hydraulic fluid flow around the first valve requiring that the fourth valve be closed prior to hydraulic fluid flow being available to the first valve and the hydraulic motor of the spinner; and a switch movable between an off position and a first actuation position and movable between the first actuation position and a second actuation position, with the fourth valve being actuated in both the first and second actuating positions, with the third valve being actuated only in the second actuating position.

26. The top dresser of claim 25 with hydraulic fluid flow through the first path of the first control valve bypassing the second control valve and the hydraulic motor for driving the dispensing conveyor.

27. The top dresser of claim 26 with the first control valve adjustably varying hydraulic fluid flow between the first and second paths of the first control valve; and with the second control valve adjustably varying hydraulic fluid flow between the third and fourth paths of the second control valve.

* * * * *